US006943511B2

(12) United States Patent  
Beckerman

(10) Patent No.: US 6,943,511 B2
(45) Date of Patent: Sep. 13, 2005

(54) ELECTRONIC INDUSTRIAL MOTOR OPERATOR CONTROL SYSTEM

(75) Inventor: Howard Beckerman, Red Bank, NJ (US)

(73) Assignee: Mechanical Ingenuity Corp, Shrewsbury, NJ (US)

( * ) Notice: Subject to any disclaimer, the term of this patent is extended or adjusted under 35 U.S.C. 154(b) by 23 days.

(21) Appl. No.: 10/773,291

(22) Filed: Feb. 9, 2004

(65) Prior Publication Data

US 2005/0174080 A1 Aug. 11, 2005

(51) Int. Cl.⁷ .............................................. H02P 1/22
(52) U.S. Cl. ...................... 318/286; 318/285; 318/467; 318/283; 318/266; 49/28
(58) Field of Search ................................ 318/285–286, 318/468, 282, 283, 256, 466, 467, 480, 465, 318/265, 266; 388/815, 833, 903; 49/28

(56) References Cited

U.S. PATENT DOCUMENTS

| | | | | |
|---|---|---|---|---|
| 3,855,509 A | * | 12/1974 | Wright | 318/753 |
| 4,035,702 A | * | 7/1977 | Pettersen et al. | 318/285 |
| 4,119,896 A | * | 10/1978 | Estes et al. | 318/266 |
| 4,234,833 A | * | 11/1980 | Barrett | 318/282 |
| 4,263,536 A | * | 4/1981 | Lee et al. | 318/266 |
| 4,338,553 A | * | 7/1982 | Scott, Jr. | 318/266 |
| 4,357,564 A | * | 11/1982 | Deming et al. | 318/280 |
| 4,360,801 A | * | 11/1982 | Duhame | 340/521 |
| 4,369,399 A | * | 1/1983 | Lee et al. | 318/467 |
| 4,385,296 A | * | 5/1983 | Tsubaki et al. | 340/825.72 |
| 4,405,923 A | * | 9/1983 | Matsuoka et al. | 340/825.56 |
| 4,408,146 A | | 10/1983 | Beckerman | |
| 4,433,274 A | * | 2/1984 | Duhame | 318/283 |
| 4,464,651 A | * | 8/1984 | Duhame | 340/521 |
| 4,491,774 A | * | 1/1985 | Schmitz | 318/282 |
| 4,701,684 A | * | 10/1987 | Seidel et al. | 318/282 |
| 5,218,282 A | * | 6/1993 | Duhame | 318/603 |
| 5,247,232 A | * | 9/1993 | Lin | 318/468 |
| 5,357,183 A | * | 10/1994 | Lin | 318/468 |
| 6,020,703 A | * | 2/2000 | Telmet | 318/480 |
| 6,064,165 A | * | 5/2000 | Boisvert et al. | 318/465 |
| 6,181,095 B1 | * | 1/2001 | Telmet | 318/480 |

* cited by examiner

Primary Examiner—Paul Ip

(57) ABSTRACT

This invention discloses an electronic control system for an Industrial Motor Operator that uses standard steady state logic to improve reliability in rough service wet and dirty environments. It includes means of providing electronic snow limit to close limit sensing removing the need for two switches and radically improving its accuracy. A low voltage switch reverses the high voltage motor wires and at the same time reverses the open limit, close limit, and snow limit sensors mechanical positions. It discloses a system using lamps to indicate that the power wiring is connecting to three-phase motors in the correct sequence or that single-phase motors have their windings correctly phased.

8 Claims, 1 Drawing Sheet

ELECTRONIC INDUSTRIAL MOTOR OPERATOR CONTROL SYSTEM

BACKGROUND OF THE INVENTION

Industrial door/gate motor operators distinguish themselves from residential garage door operators by using three pushbuttons, open, close, and stop. Called a three-button station their operation would seem to be obvious but there are variations. Automatic operation, termed "momentary", requires just a momentary press of the open or close button to move the motor operator to its limit of travel. Momentary operation requires a safety device such as a safety edge or photo-eye so as not to crush something in the opening. Non-Automatic operation, termed "constant", requires constant pressure on a pushbutton to move the motor operator to its limit of travel. Constant operation requires that all three-button stations be next to the entryway and that releasing the pushbutton will immediately stop the operator. Further distinction between residential and industrial motor operators is that of output torque, industrial operators are those that exceed 100-lbs of force, and such distinctions are in U.L. Specification 325.

Single button operation is a rarely used option but available for industrial motor operators. If the entry is fully open, pushing this button will close it. If the entry is fully closed, pushing this button will open it. If the entry is actively closing, pushing this button will cause it to stop for a moment and then re-open. This is termed, an "Auto" function and is different from residential door operators. Residential motor operators have only a single button that delivers the sequence, opening-stop-closing-stop and the cycle repeats. A quick glance at the sequence shows that whenever the door, stops between the limits, either opening or closing will follow with equal certainty. If the person standing at the button walks away, the next person attempting to enter a partially open door may press the button and get an unexpected closing, followed by an unexpected stop. Rapidly pressing the pushbutton during an emergency gives a revolving roulette wheel of commands and three out of four are wrong. Industrial motor operators command hundreds or even thousands of pounds of force and uncertainty about their direction of movement is bad. Therefore, the single button auto function in industrial motor operators should not include the ability to stop the operator in a partially open position.

There usually are numerous pushbuttons, radio controls and pull cords in operation on one motor operator at one time and conflicts occur regularly. If one person is pressing a close button on one side of an entryway, while at the same time another person is pressing an open button on the other side of the entryway, the motor operator must prefer the open command. The occupant entering has priority over those leaving an entrance. In addition, the closing function is to some extent more hazardous than the opening function. Pressing a stop button, even for a moment, overrides the continuous pressing of either an open or a close button. A shorted button, stuck radio control, blocked photo-eye can issue a continuous command to the motor operator to move in a direction. A continuous command to move might force a person to stand at the stop button, holding it, to prevent movement. This does not allow a responding person to give aid to potential victims. Trapped at the pushbutton station he can only call for someone to turn off power. Therefore, the stop function should latch until all buttons are released everywhere in the system.

In general, the person standing at the entryway will always be able to interpret a safety hazard better than any safety sensor or computer controlled motor operator. The person responding to an emergency will not be skilled in motorized operators. Assuredly, they will not have time to read the manual, safety stickers, or interpret alarms and flashing lights. They are likely to be just a passerby rushing to the aid of someone in trouble at the door or gate. Therefore, the Open Close and Stop buttons must always perform as stated and not change their functions.

Motor operators must have a fully open and a fully closed position setting most commonly implemented by two limit switches and a rotating threaded shaft with non-rotating threaded nuts. The threaded shaft rotates as the door/gate moves by a mechanical linkage driving the threaded nuts linearly. Thereby every position of the door/gate has an exact proportional position of the nut on this shaft. At the limit of travel, the nut presses against a limit switch that signals the motor operator to stop moving in that direction. Limit switches are commonly of the, "normally closed" type, which open their contacts when the threaded nut presses on their lever. This configuration allows that if contact is lost, the motor will not even begin to operate in that direction, indicating a defective or disconnected switch. This is an important safety feature when commanding thousands of pounds of force.

The safest method of obstruction detection is the sensing edge that attaches to and travels with the edge of the moving load. Other fixed, non-moving means of detection such as photo-eye beams, ultrasonic detectors, infrared or motion detectors all have dead zones and blind spots. Motor operator torque detectors using speed, current, chain tension, etc. all depend on a smooth running load because a torque dip follows a torque spike and during the dip, obstruction-sensing force is huge. Force applied along a sensing edge is independent of motor load and there are no dead zones. A sensing edge makes an electrical contact by touching an object signaling the motor operator to immediately stop and then open. Using such devices requires a new operator positional limit in addition to the standard "close limit" and "open limit", called the "snow Limit". Historically named, because a buildup of snow activated the sensing edge too early; before actually reaching the motor operators close limit. In fact, even when there is no snow, it is impossible to close an entryway so that it will seal tightly without first pressing its sensing edge. Therefore, at or past the snow limit, the sensing edge signal no longer reverses the motor operator, but just stops it.

The snow-limit distance, as stipulated in standards, is 2-inches before the fully closed position. During the final 2-inches of travel, the sensing edge will just stop the operator thereby trapping anything it stops on and pressing on it with considerable force. Even so, the two-inch standard seems to be reasonable in that even if a child were to press the close button and then lie down in the doorway to see what develops he will project more than 2-inches. Any other living thing less than 2-inches in height are not likely to be able to complain about the experience. Nevertheless, if this snow limit were to drift to 4-inches a serious safety hazard would exist. The operator could stop trapping a person under it with the full force of both the door and the motor operator pushing on him. It is therefore important that the snow limit never exceed 4-inches from the fully closed position.

Installers typically test the operation of each sensing edge by using a tool called a "two by four" placed between the sensing edge and the fully closed position. The motor operator optimally causes the sensing edge to stop on the 1½-inch side and then in a second test, stop and open on the 3½-inch side. Passing this test means that the motor operator's snow-limit engages 2½ inches from the floor with a tolerance of (+/−) 1-inch to allow for drift or wear. Mechanically the tolerance from the snow-limit switch to the close-limit switch is hard to adjust and critical to safety. The threaded limit shafts length, typically 5-inches, proportions to a 20-foot door/gate, or a ratio of 5:240 inches, such that 1-inch at the entryway equals 0.020-inches on the threaded shaft. Therefore, the snow-limit switch lever must be located 0.050-inches before the close-limit switch lever at a tolerance of +/−0.020-inches. In practice this is hard to achieve and harder to maintain over time as the various mechanical components wear.

Reversing the direction of a motor operator while, it is still rotating places a strain on its bearings, windings and metal components that is hundreds of times greater than its normal static load. Some single-phase motors will not reverse direction at all unless they come to a complete stop and continue to run in the original direction at full torque. Therefore, it is desirable to allow the motor operator to come to a complete stop before reversing direction. A simple timer set for one or two seconds whenever reversing direction can allow the motor to coast to a stop before reversing. Unbalanced loads can cause longer coast to stop times by back feeding from the output shaft through the gearbox to the motor. In these instances manufacturers use electrically actuated brakes or special gearboxes to prevent such excessive coasting.

Most industrial motor operators will drive their connected load at velocities less than 6-inches per second. If the moving edge contacts an obstruction, it has more than enough force to move it 6-inches in a second; for example, pressing the top of a persons head even with their shoulder blades. It is critical that any obstruction sensors such as sensing edges, photo-eyes, ultrasonic, or other devices are working prior to using a motor operator. Many but not all obstruction sensors are "monitored", "fail-safe", or "supervised" such that if they are not operating correctly, or are disconnected they signal a continuous obstruction and the motor operator will not run. Monitored sensors have two circuits, the monitoring circuit and the sensing circuit. The sensing part is mounted somewhere in the entryway to sense an obstruction while the monitoring part is mounted inside or on the motor operator. If the monitoring part detects the loss of the sensing part it closes a contact, signaling the motor operator to stop operating in one direction.

Industrial motor operators have a rotating output shaft that couples to its load using roller chain and is relatively universal. It can drive its connected load from the right hand side, left hand side, from the front, back, top or bottom and thereby may require differing rotational direction with differing installations. For example, opening an entryway could require a clockwise shaft rotation with the motor operator mounted inside the room and counterclockwise rotation if mounted outside the room. Reversing the output shafts rotation involves reversing motor wires and reversing the open-limit, close-limit, and snow-limit switches location on the threaded shaft. If a motor operator manufacturer makes two models for the different rotations, he still must deal with three-phase motors and power lines connecting out of sequence. The installer knows he has the wrong power line sequence or the wrong rotation if he presses the open pushbutton and the connected load closes.

It is critical to know that when the motor is driving the load open, the threaded shaft nuts are traveling toward the open limit switch. Conversely, when closing, the nuts must travel toward the close-limit and snow-limit switches. Incorrect rotation has the entry opening when the threaded shaft nuts are traveling toward the snow and close-limit switches. This is a serious safety hazard as the motor operator will run past the incorrect limit and apply its full torque to the stalled load or the structure holding it. Motor operators thereby should function such that pressing either limit switch, or specifically the wrong limit switch, stops its rotation. This solves one problem but creates another; it becomes possible to have an entryway that opens when pressing the open button but inside the motor operator, it is actually stopping at the close limit switch. The snow-limit function is then missing from the closing cycle and has moved to the opening cycle. Thereby, a closed entryway opens by pressing on the sensing edge or blocking a photo-eye, and the entryway is no longer secure. The installer must insure that the threaded shaft nut is traveling toward the correct limit switch.

The installer usually adjusts the limit switches or threaded shaft nuts while the motor operator has power, and while standing on a 25-foot ladder. Seemingly, no amount of coaxing will get them to stop doing this. During this adjustment, the limit switch will make and brake numerous times until deemed, just right. It is therefore safer if the limits electrically latch such that releasing the limit switches lever does not cause the motor to run.

Connections from pushbuttons to the motor operator use long lengths of low voltage, multi-conductor, unshielded thermostat wire. Nearly every motor operator manufactured uses thermostat type 24-volt controls and wires. It is common that a complete switch wire run totals 1,000-feet. Electronic motor operators do not draw significant current through their switches and therefore do not have wire length limitations but must deal with 1,000-feet of unshielded wire picking up every electrical blip produced by an industrial environment.

It is common wiring practice to disconnect low voltage power from the operator if the motor overheats or when using a manual pull chain. Most stop switches or lock switches simply disconnect 24-volt control power to the operator. Thereby, motorized operators must identify the loss of power as a stop switch signal.

This background description incorporates technical data from the author's knowledge, Underwriters Laboratories specification UL-325, and DASMA, (Door & Access Systems Manuf. Assoc., www.dasma.com) documents. It is a condensed representation of the field of industrial motor operators, is comprised of well-known facts, and well-known functions to those experienced in this subject matter.

DESCRIPTION OF PRIOR ART

Pertinent patent office art utilizing three button stations in any motor operator or prior art on industrial types of motor operators seem to be lacking. Thereby, mitigating this applications long and extensive Background Description. Prior patent office art primarily addresses residential garage doors with single pushbutton operation. Indicative art includes my U.S. Pat. No. 4,408,146, October-1983 and U.S. Pat. No. 4,369,399, Lee et al, January-1983 both utilizing single button operation and flip-flop controlled hard wired logic circuitry. U.S. Pat. No. 5,218,282, Duhame, June 1993 also utilizes single button operation but avoids hard wire logic by using a microprocessor control.

Most industrial operators manufactured today use relay-logic with individual connected wires. They typically miss many of the primary safety functions described in the background of the invention but are popular due to their simplicity. Other industrial operator manufacturers use microprocessors to master some of the complex functions described in the background of the invention. Microprocessors have some reliability disadvantages in a simple control system, most notably a high frequency clock, and stored software programming requiring some kind of non-volatile memory.

Low voltage DC logic generally performs well in the presence of heat or moisture and a typical example is 12-volt automobile engines that operate reliably with open soaking wet connectors and wires. The exception is low voltages at high frequencies wherein moisture conducts the oscillating signal over to adjacent lines causing corrosion and wreaking all kinds of logic mayhem. A clock signal is susceptible to having its transitions deformed by moisture, electrical noise and double or missing clocks occur. Coating the circuitry removes the moisture but adds dielectric capacitance to adjacent paths and spacing becomes important. Automobile designers place microprocessors inside a watertight enclosure and that is part of its associated overhead cost. These problems, common with microprocessors, are not a factor with simple steady state hardwired logic.

Flip-flop logic relies upon the storage of one-bit of electronic memory and a fast rising clock signal. The fast rising clock has the aforementioned moisture and noise susceptibility. Losing one-bit of flip-flop storage during a power outage can mean that the direction of travel is uncertain. Battery backup solves this problem but adds significant cost and once the battery wears out, a dangerous situation develops. Industrial motor operators command hundreds or even thousands of pounds of force and uncertainty about their direction of movement is bad.

Microprocessors use software but also require substantial hardwired logic to interconnect external support items such as power supplies, memory, data busses, noise filters and power components such as relays. The hardwired logic portion requires a printed circuit board its printed pattern establishing a secondary type of programming, because different connections produce diverse logical results. In contrast, simple wired logic uses various logic elements connecting with a printed circuit pattern to produce a specific logical result, but does not require the additional step of software programming. In a simple system, Microprocessors are more expensive than individual logic elements but make up for this by requiring less labor due to a lower number of components. However, the recent arrival of automatic insertion equipment capable of placing microscopically small components at a 300-per-minute rate makes such labor advantages moot. The objective of this invention is to provide all the functions of an industrial operator without using microprocessors or flip-flop logic thereby lowering overall costs and improving reliability.

BRIEF SUMMARY OF THE INVENTION

This invention discloses an electronic control system for an Industrial Motor Operator that uses standard steady state logic to improve reliability in rough service wet and dirty environments. It includes means of providing electronic snow limit to close limit sensing removing the need for two switches and radically improving its accuracy. A low voltage switch reverses the high voltage motor wires and at the same time reverses the open limit, close limit, and snow limit sensors mechanical positions. It discloses a system using lamps to indicate that the power wiring is connecting to three-phase motors in the correct sequence or that single-phase motors have their windings correctly phased.

It discloses a system allowing the close pushbutton to close the entryway even when it is actively opening or partially open and still have open button priority over the close button. It eliminates stuck auto, stuck radio control and stuck close switch problems. The new stop function discloses latching a stop command and gives it priority over all opening or closing commands. Thereby the Open Close and Stop buttons always perform as stated and do not change their functions based on some complicated control scheme.

Dozens of auxiliary functions are possible by using a parallel data-buss system. The motor operator stops even if the wrong limit switch activates preventing over traveling of the limit problems.

DETAILED DESCRIPTION OF THE INVENTION

Figure 1:
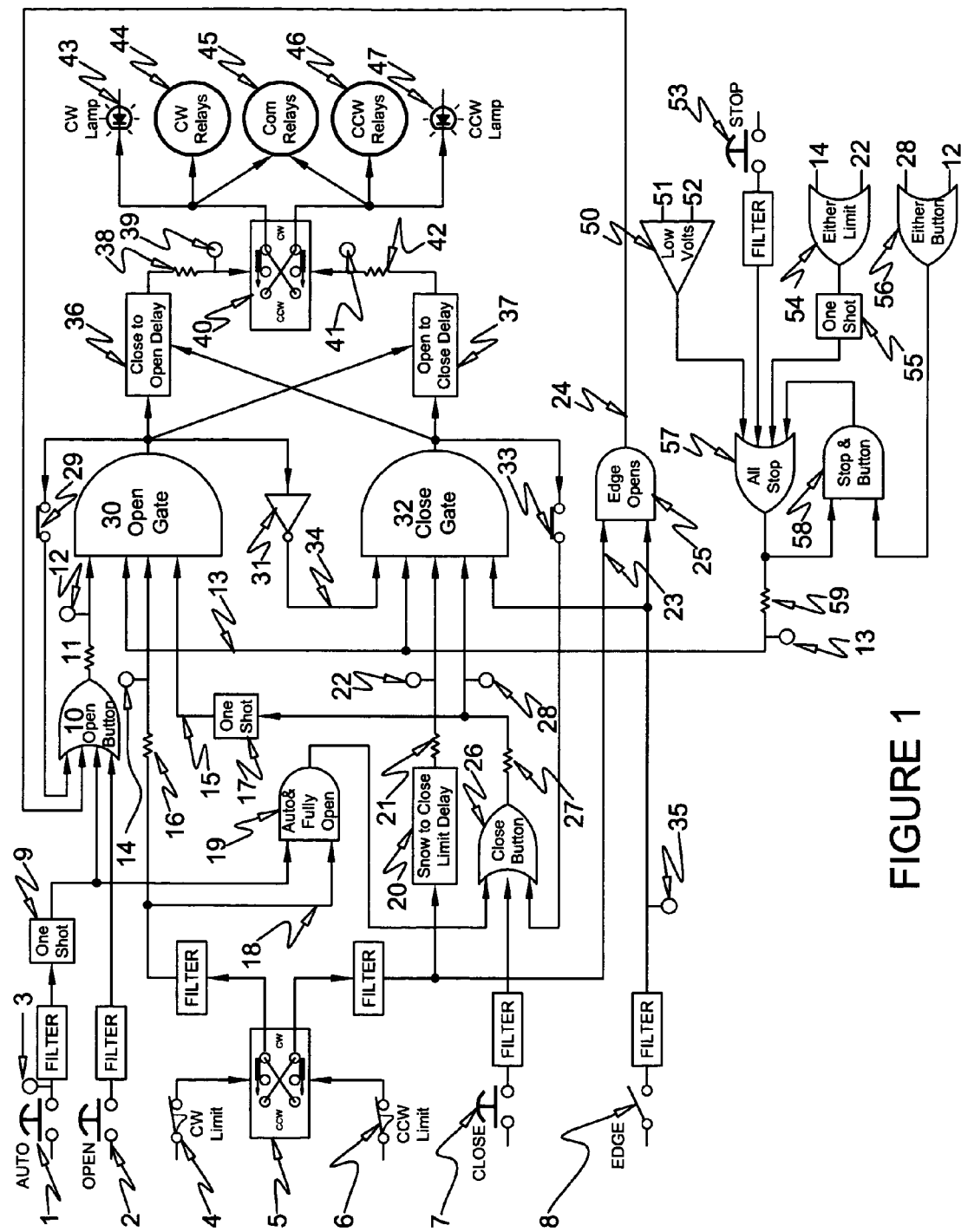
FIG. 1 is a block diagram of the inventions control logic.

The Open-Button gate 10, of FIG. 1, reacts to Open-Pushbutton 2 or any other open signal (logical OR) by driving resistor 11 to input 12 of the Open-Gate 30. The output of Open-Gate 30 connects to slide switch 29, feeding back into the Open-Button gate 10 thereby latching both gates. Once latched, both gates remain latched even after releasing Open-Pushbutton 2. Removing any other input signal from Open-Gate 30, such as, stop signal 13, or limit switch signal 14, or the I-shot signal 15 will disable gate 30 and unlatch its output. Open-Gate 30 remains off and disabled until the return of all its input signals (logical AND). Disconnecting slide switch 29, removes the above-mentioned feedback latching command such that constant pressing of Open-Pushbutton 2 is required to maintain an output signal from Open-Gate 30. A constant open command at 12 cannot produce an output signal from Open-Gate 30 unless signals 13, 14, and 15 are continuously present. In this manner, slide switch 29 is able to select between "constant" or "momentary" operation of the open function.

The Close-Button gate 26, of FIG. 1, reacts to Close-Pushbutton 7 or any other close input signal (logical OR) by driving resistor 27 to input 28 of the Close-Gate 32. The output of Close-Gate 32 connects to slide switch 33, feeding back the signal into the Close-Button gate 26 thereby latching both gates. Once latched, both gates remain latched even after releasing Close-Pushbutton 7. Removing any other input signal from Close-Gate 32, such as, stop signal 13, or limit switch signal 22, or safety edge signal 35, or un-open signal 34, will disable Gate 32 and unlatch its output. Close-Gate 32 remains off and disabled until the return of all its input signals (logical AND). Disconnecting slide switch 33, removes the abovementioned feedback latching command such that constant pressing of Close-Pushbutton 7 is required to maintain an output signal from Close-Gate 32. Furthermore, a constant close command at 28 cannot produce an output signal from Close-Gate 32 unless signals 13, 22, 34, and 35 are continuously present. In this manner, slide switch 33 is able to select between "constant" or "momentary" operation of the close function.

Inverter 31 disables Close-Gate 32 when the Open-Gate 30 output signal is present thereby preventing both opening and closing at the same time. This is not an instantaneous occurrence as Open-Gate 30 signal is there moments before Close-Gate 32 signal releases, such that for several microseconds Open-Gate 30 and Close Gate 32 both have output signals. The output delays 36 and 37 solve both this ripple effect problem and an instant reversing problem. Normally 36 and 37 produce no discernable delay, the Open-Gate 30 output passes instantly through delay 36 and Close-Gate 32 output passes instantly through delay 37. The Close-Gate 32 output signal enables a 1–2 second delay into 36 producing a close to open signal delay and conversely, the Open-Gate 30 output signal enables a 1–2 second delay into 37 producing a open to close signal delay. This allows the motor to coast to a stop before reversing direction and prevents any ripple problems in the logic circuitry but allows for instant action while no actual reversing is occurring.

A signal from Delay 36 drives resistor 38 through reversing switch 40 energizing relays and lamps depending on the position of the reversing switch. For example, in the position indicated it drives CW-Lamp 43, CW-Relay 44 and Com-Relay 45. Conversely, a signal from Delay 37 drives resistor 42 through reversing switch 40 energizing relays and lamps depending on the position of the reversing switch. For example, in the position indicated it drives CCW-Lamp 47, CCW-Relay 46 and Com-Relay 45. Relays 44 and 46 are reversing relays that cross connect the power line voltage to the motor in order to drive it in different directions. Relay 45 is common to either direction of rotation and is handy for actuating electric brakes, lamps, or any item that must operate in either direction. On three-phase motors, relays 44 and 46 reverse two of the power line phases while relay 45 simply connects the third phase directly. On single-phase motors, relays 44 and 46 reverse the polarity of the start winding while relay 45 simply connects the motors run winding. In this manner one relay arrangement, handles three-phase or single-phase motors.

The Snow limit switch and the close limit switch described in the background statement are, per this invention, one actual switch for example switch 6 followed by a filter and a short interval electronic timer 20. There is always some doubt over the accuracy of any timing means that measures a distance because as the load varies the motor speed varies and therefore the distance changes. In reality, once an AC motor reaches its full speed it synchronizes closely to the power line frequency such that for short distances time is an extremely accurate indication of position.

The difference between a fully loaded motor, drawing full load amperage, and an unloaded motor is about 30-rpm, using 1800-rpm motors. Fully loaded the motor spins at 1,750-rpm, while unloaded it spins at 1,780-rpm. Thereby, there is only a 1.7% speed variation from full to no load (30-rpm/1800). If a snow limit switch is set such that it activates 2-inches from the fully closed position and starts a timer the deviation of the snow limit to close limit due to motor loading will be, 2-inches multiplied by 1.7% or 0.034-inches in the entryway.

Since the threaded shaft inside the motor operator is 5-inches long and the entryway is 20-feet long, a ratio of 5:240-inches exists. The 0.034-inch accuracy at the entryway divided by 240 then equates to a threaded shaft accuracy of +/−0.00015-inches. Therefore, the timer method of determining snow limit to close limit position is several orders of magnitude above that obtainable by a field mechanic.

This methodology only works well over short distances and only after the motor reaches synchronous speed. For example, a 1.7% variation due to motor load on the entire 20-foot entryway yields 4-inch accuracy (1.7%×240"). The difference between an entryway being closed, sealed, and secure verses being open too much is just a ¼-inch gap. The 4-inch variation is 16-times this and is the reason motor operators avoid using time as a position indicator. Reversing the calculation to determine the maximum distance for ¼-inch accuracy, yields 60-inches (¼×240") and therefore the 2-inch snow to close limit distance is well below this maximum.

Prior to this disclosure, the closing limit of travel produced two signals, close and snow signals, therefore were substantively different from the open limit. Eliminating the mechanical close-limit and replacing it with an electronic timer makes the open limit of travel and close limit of travel essentially appositionally interchangeable. Switch 5, of FIG. 1, is 2PDT connecting with its outside poles cross wired such that it can electrically exchange position detectors 4 and 6. A limit becomes the open-limit whenever it connects to the resistor 16 and becomes the snow/close-limit if it connects to the Snow-To-Close-Timer 20. The benefit of Timer 20 is that the limits need not move mechanically to reverse them, and the benefit of switch 5 is that the wires need not move.

The limits 4 and 6 are of the normally closed type such that at either limit of travel a signal is lost. The loss of an Open-Limit signal travels through a noise filter removing the drive from resistor 16, input 14 and disabling the Open-Gate 30 thereby stopping the open cycle. Loss of the Close-Limit signal travels through a noise filter to Delay 20 and after a short delay removes drive voltage from resistor 21, input 22 and disables Close-Gate 32. This stops the closing cycle. A broken wire to either limit also causes a loss of signal and the operator will not move in that direction. Once the limit signal is lost, Open-Gate 30 or Close-Gate 32 de-latches and restoration of the signal cannot move the operator until a pushbutton command occurs. In this manner, the adjustment of the limits is safer during installation.

Switch 5 and switch 40 are actually one 4PDT switch in this embodiment that reverses both the motors direction of rotation and the limit switches at the same time. This effectively allows the motor operator to open with either clockwise or counter clockwise shaft rotation. Each switch cross connects such that in one position CW limit switch 4 connects through switch 5 a filter and resistor 16 to open limit input 14. In its other position CW limit switch 4 connects through switch 5 a filter and snow to close limit delay and resistor 21 to close limit input 22. In this manner, the installer only flips a switch to reverse the operators' rotational direction and need not reverse the motors wires and limit switches positions depending on his mounting location.

Follow the signal from CW-Limit 4 through switch 5, in its drawn position, to resistor 16, then input 14 of Open-Gate 30, Delay 36, resistor 38, and through switch 40, in its drawn position, to CW-Lamp 43. CW-Limit 4 controls CW-Lamp 43 and placing the CW-Lamp mechanically next to the CW-Limit indicates it is the active limit. In this switch position, the Open-Button rotates the motor operator CW (clockwise).

When switch 5 and 40 slide together to the left the CW-Limit 4 connects now to 23, through Delay 20, resistor 21, Close-Gate 32, Delay 37, resistor 42, switch 40, and finally once again back to CW-Lamp 23. The CW-Limit 4 and CW-Lamp 43 remain, linked together. In this switch position, now the Close-Button rotates the motor CW (clockwise).

Mechanically placing CW-Lamp 43 next to CW-Limit 4 and CCW-Lamp 47 next to CCW-Limit 6 informs the installer which specific limit is active. If the electric motor is driving the limit indicator, for example moving threaded nuts towards the illuminated limit-switch, then the motors power line wires have the correct phase. Conversely, if it drives the threaded nuts towards the unlit limit-switch, the motors power line wires need reversing. In this manner, the system aids in the correct wiring of the operator.

Pressing the close-switch 7 sends a signal through a filter to an input of the Close-Button-Gate 26 causing a signal on its output. This output signal drives resistor 27 to the Close-Gate input at 28 to start the closing cycle but also to 17 a one shot that disables the Open-Gate 30 at its input 15. A fully open entryway disables the Open-Gate 30 in advance due to its open-limit input 14 such that the close-one-shot circuit has no visible effect once fully open. On an actively opening entryway, the close-one-shot pulse from 17 disables the Open-Gate 30 allowing inverter 31 to enable the Close-Gate 32 and the closing cycle begins. Thereby, pressing the close button during the opening cycle stops the operator for 1–2 seconds and begins a closing cycle. The close-one-shot duration is less than 0.1-second such that pressing both open and close buttons always has the open button winning because the close signal disappears rapidly. Also holding the close button or a shorted close button cannot stop the open cycle and allows the freeing of an obstruction.

Pressing the sensing edge switch 8 sends a signal through a filter to disable an input 35 of the Close-Gate 32, thus immediately stopping the closing cycle. The sensing edge also connects to an Edge-Opens gate 25 (logical AND) that enables/disables based on the snow-limit at its input pin 23. The Edge-Opens 25 output pin 24 connects to an Open-Button 10 input such that it signals an open command when not at the snow-limit and disables the open command when at the snow-limit. Thus, the sensing edge always stops the closing cycle on sensing an obstruction but reverses the operator to the opening cycle before reaching the snow-limit. Continuous sensing edge signals permanently disable the close cycle and the operator can then only open. A fully closed entryway will usually press on the sensing edge and a continuous signal generates, but the operator will still open.

Pressing the Auto-Switch 1 sends a signal through a filter to enable an auto-one-shot circuit 9 that produces a very short 0.1-second pulse signal with each press of the switch. The auto-one-shot signal enables the Open-Button gate 10 and an Auto-Fully-Open gate 19. The Auto-Fully-Open gate 19 (logical AND) enables only at the fully open position as its input 18 connects to the open limit signal. Thus, the Auto-Switch always tries to enable the Open-Button gate 10 but enables the Close-Button gate 26 only at the fully open position. The brief one-shot pulse insures that the auto signal is gone far before the motor operator can rotate off the open limit thereby changing signal 18. It also prevents the auto signal or a stuck auto signal from interfering with the three-button station.

The stop function generates whenever pressing the stop pushbutton 53, or if there is low line voltage 50, or upon reaching either limit of travel 54. These various stop signals connect to the All-Stop gate 57 (logical OR) that in turn un-drives resistor 59 to pin 13 disabling both the Open-Gate 30 and the Close Gate 32. The signal from the All-Stop gate 57 is in reality a go, or all is well signal, while removal or lack of the signal is a stop command. This go signal is initially absent upon the application of power until the supply achieves enough voltage to operate all the various logic gates correctly.

If a stop command occurs during an open or a close command the stop system must latch until resolution of the conflict or the removal of the open or close commands. The Stop-Button gate 58 (logical AND) performs this function by feeding back its signal to the All-Stop gate 57 thereby latching it when it receives both the stop and either button signal. Such latching continues until the removal of the either button signal. Either-Button gate 56, (logical OR) interprets pressing of the open or the close pushbutton. Its input 28 connects to the Close-Button 26 output, and input 12 connects to the Open-Button gate 10 output. It then generates a signal indicative that either button is active.

It is common wiring practice to disconnect low voltage power from the circuitry if the motor overheats or when a pull chain is in use and many stop switches or lock switches simply disconnect power. The Low-Volts comparator 50 compares a reference voltage on pin 51 to the low voltage supply on pin 52 thereby removing the go signal at its output until the power supply on 52 rises above the reference voltage on pin 51. A transformer external to the circuitry supplies the low voltage and its output is radiometric to the power line voltage. Thereby, Low-Volts comparator 50 also detects low primary side power line voltages as well as low secondary side voltages.

Either-Limit gate 54 and One-Shot 55 stops the motor operator when the wrong limit activates. Gate 54 produces an output if the open limit at 14 or the close limit at 28 activates (logical OR). Its output triggers one-shot 55 which produces a momentary pulse at its output. The one-shot pulse connects to an input of All-Stop gate 57 and stops the motor operator until the release of all pushbuttons due to the Stop-Button gate 58. It can be seen that if the one-shot were not present that the activation of either limit could cause the operator to stop permanently and never move again.

A data-Buss connector allows bi-directional remote access to the logic circuitry and all of its functions. The input/output pin 12 signals and accepts an open-button command and pin 14 signals and accepts an open-limit. The input/output pin 22 signals or accepts a close-limit command and pin 28 a close-button signal. The input/output pin 43 signals an opening command while accepting a signal to force the operator to open regardless of limits or stop signals. The input/output pin 45 signals a closing command while accepting a signal to force the operator to close regardless of limits or stop signals. The input/output pin 3 signals and accepts an Auto-button command and pin 35 signals and accepts a sensing edge signal. The input/output pin 8 signals and accepts a stop command. With these pins, external circuitry can analyze the functions and perform test procedures. They also provide functional inputs and outputs for auxiliary functions such as a Timer-To-Close function or automation controls.

Accordingly, there has been disclosed an improved industrial motor operator. While disclosing typical embodiments of this invention, various modifications to the disclosed embodiments are possible, and it is intended that this invention be limited only by the scope of the appended claims.

Claimed by Letters of Patent is:

1. A motorized door/gate operator the improvement comprising;
   a logical means connected such that at least one input produces an open-output-signal and all other inputs disables the open-output-signal;
   a logical means connected such that at least one input produces a close-output-signal and all other inputs disables the close-output-signal;
   said open-output-signal connects to inverting means that disables the close logical means, thereby disabling the close-output-signal;

an open-to-close delay circuit, arranged such that it delays the close-output-signal only after receiving the open-output-signal, otherwise, no significant open-output-signal delay is present;

a close-to-open delay circuit, arranged such that it delays the open-output-signal only after receiving the close-output-signal, otherwise, no significant open-output-signal delay is present;

a first switching means that reacts to the open-to-close delay output signal to supply power line voltage to a motor causing it to rotate in one direction; and a second switching means that reacts to the close-to-open delay output signal to apply power line voltage to the motor causing it to rotate in the opposite direction.

2. The motorized door/gate operator according to claim 1 further comprising:

the open limit and the virtual-close-limit signal connect into a logical means producing a new either-limit-signal;

the either-limit-signal couples to a one-shot circuit, producing one short duration pulse each time it is activated; and the short duration pulse connects to stop the motor operator whenever the either-limit-signal activates.

3. The motorized door/gate operator according to claim 1 further comprising:

an open switch signal and a close switch signal, connects to a first logical means producing at its output an either-switch-signal;

signal indicating that a low voltage exists and signal of the activation of a stop pushbutton switch connecting to a second logical means to produce an All-Stop Signal, such All-stop signal connects to stop the opening and closing of the motor operator;

the either-switch signal and the All-Stop signal connects to a logical means producing at its output a third signal, such third output signal indicates pressing either pushbutton at the same time as a low voltage is present, or while a stop pushbutton is pressed; and feeding back the third signal into the logical means producing an All-Stop signal thereby latching the All-Stop signal until removal of the either-switch-signal.

4. The motorized door/gate operator according to claim 1 further comprising:

a close pushbutton switch connects such as to produce a close-switch-signal;

the close-switch-signal couples to a one-shot-circuit, producing a short duration pulse with each press of the close pushbutton switch;

the short duration pulse connects to stop the opening cycle of the motor operator; and the close-switch-signal also connects to start rotation of the motor in the close direction.

5. A motorized door/gate operator the improvement comprising:

a close limit of travel sensing means connecting to change the logical operation of obstruction sensing from opening a motor if obstructed to stopping the motor if obstructed;

the close limit of travel sensing means also connects to a delay circuit, arranged such that it delays the close limit signal forming a virtual-close-limit signal;

the virtual-close-limit signal connects to stop rotation of the motor in the close direction; and an open limit sensing means connects to stop rotation of the motor in the open direction.

6. The motorized door/gate operator according to claim 5 further comprising:

switching means to reverse the limit sensing signals such that the close limit of travel becomes the open limit of travel and conversely the open limit becomes the close limit.

7. The motorized door/gate operator according to claim 6 further comprising:

light means indicating which particular limit sensor is active;

placing the light means next to said limit-sensors such that, when the motor produces the correct rotation a moving mechanical position indicator moves toward the illuminated light means; and conversely, when the motor produces the incorrect rotation the moving mechanical position indicator moves away from the illuminated light.

8. The motorized door/gate operator according to claim 5 further comprising:

first relay means to rotate an electric motor shaft in one direction and a second relay means to rotate the motor shaft in an opposite direction;

a first signal represents an opening command and a second signal represents a closing command;

a switch selects one of two rotational directions;

means configures to reverse the first signal and the second signal in response to the position of the switch; and means to energize the relays based on reversing the first and second signals.

* * * * *